Patented Dec. 5, 1950

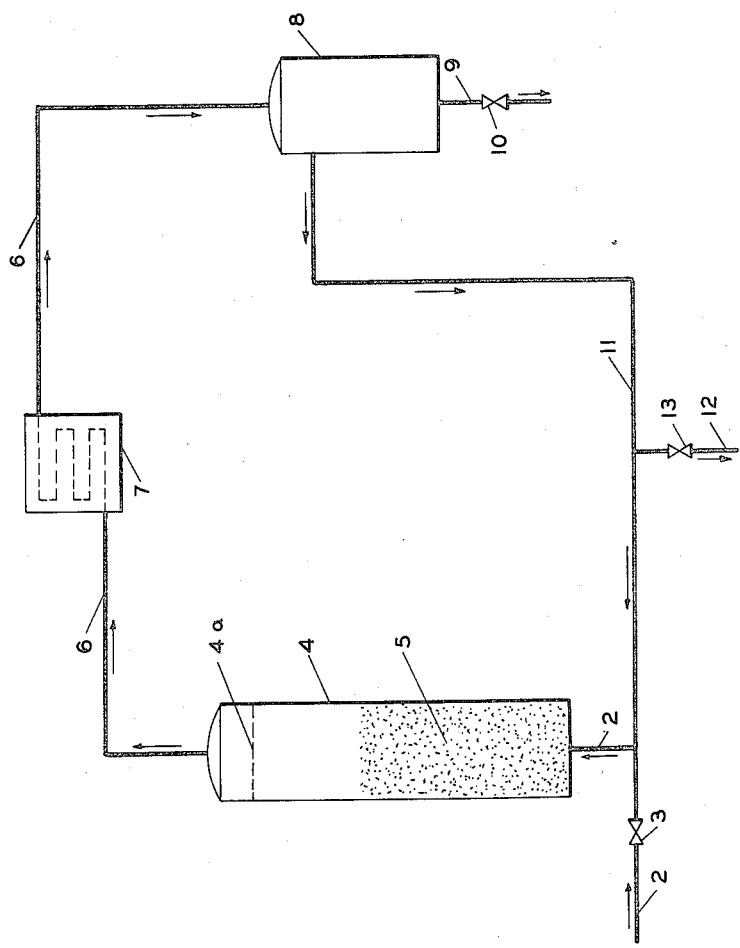

2,532,621

UNITED STATES PATENT OFFICE 2,532,621

PRETREATMENT OF HYDROCARBON SYNTHESIS CATALYSTS

John Paul Hogan, Bartlesville, Okla., assignor to Phillips Petroleum Company, a corporation of Delaware Application April 22, 1947, Serial No. 743,171

6 Claims. (Cl. 260—449.6)

The present invention relates to the synthesis of hydrocarbons by the catalytic conversion of carbon monoxide-hydrogen mixtures and in particular to the formation of liquid hydrocarbons in such a reaction. In a particular aspect, it relates to the initial stages of such processes in which fresh catalyst is put to use. In a more specific aspect the present invention relates to a method in which such fresh catalysts are "broken in" so as to modify their initial undesirable activity.

In the synthesis of hydrocarbons from carbon monoxide and hydrogen by the process now commonly known as the Fischer-Tropsch process, carbon monoxide-hydrogen mixtures are contacted with suitable catalysts at elevated temperatures and elevated pressures to form a mixture of hydrocarbons including normally gaseous and normally liquid as well as solid materials. Eventually, the catalyst becomes deactivated by the deposition thereon of waxy and/or carbonaceous deposits at which point the catalyst is reactivated by the removal of these deposits. It has been found that the catalysts have different effects in the reaction when fresh or when newly regenerated, and possess an undesirably high initial activity with the result that they effect undesirably high production of such compounds as carbon dioxide and methane, and undesirably low production of desired liquid hydrocarbons, in the initial stages of the conversion. In addition the production of the undesirable material is accompanied by the generation of enormous quantities of heat which unless promptly removed will result in carbon deposition on and injury to the catalyst. It has been the prior practice to remove the excess heat during the initial stage of the reaction and allow the conversion to proceed until the activity of the catalyst declines to such a degree that liquid hydrocarbons are produced in desired proportions. This procedure is generally known as "breaking in" the catalyst and it is with a modification of this stage of the process that the present invention is primarily concerned.

In accordance with the present invention fresh or newly regenerated catalyst of the Fischer-Tropsch type is contacted with carbon monoxide-hydrogen synthesis gas under conditions of total recycle of effluent gas while the reaction temperature is slowly increased until reaction begins. The reaction temperature is then slowly and gradually increased to the desired operating temperature and effluent gas is withdrawn from the system at such a rate that the carbon-monoxide content of the effluent gas is permitted to increase to a definite concentration, during which period the temperature is increased to the desired operating point. During this period only enough additional synthesis gas required to maintain reaction pressure is charged to the reactor. Preferably the increase in temperature from the point at which reaction begins, to the desired operating temperature, is carried out over a period of from 2–10 hours and may be accomplished intermittently in increments or may be carried out at a gradual and uniform rate. During this period the carbon monoxide content of the effluent gas is permitted to increase from about 2–3 to 6–12 mol per cent. By the application of this procedure, reduction of the activity of the catalyst is controlled and injury to the catalyst is avoided. Following this breaking-in procedure normal operations of the Fischer-Tropsch process may be carried out without interruption by continuing the flow of synthesis gas and recovering the effluents at the desired rate.

It is, therefore, an object of the present invention to provide a process for the conversion of carbon monoxide-hydrogen mixtures to hydrocarbons in which fresh or newly regenerated catalysts are used and in which the initial activity of these catalysts is modified in a novel and effective manner. It is a further object of the present invention to carry out such a process in which the initial activity of the catalyst is modified while avoiding the undesirable production of carbon dioxide and methane and the generation of excessive heat.

The present invention is applicable to all of the conventional types of Fischer-Tropsch catalysts including those containing cobalt, nickel, or iron. Recently, it has been found that throughputs and consequently production rates in the Fischer-Tropsch process can be greatly increased by the use of finely divided iron catalyst prepared by the reduction of iron oxide. These catalysts are utilized in suspension in synthesis gas in either continuous or fluidized fixed bed operation. Iron catalysts of this type may be prepared by fusing iron oxide, grinding to a desired particle size, say 60–250 mesh, and reducing with hydrogen. Promoters such as alkali metal oxides and alumina are advantageously incorporated in the catalyst. The present procedure has been found to be particularly advantageous in the breaking-in of finely divided iron catalysts such as those described herein. The term "fresh catalyst" as used herein is intended to apply to new catalyst not previously used as well as to newly or freshly reactivated catalyst which has previously been spent in the reaction and then reactivated by a suitable treatment.

Reaction temperatures and space velocities will depend on the catalyst employed. For cobalt-thoria type catalyst, the temperature range is approximately 180–220° C., for nickel-thoria the temperature range is about 170–200° C., and for iron catalysts used in fixed beds the temperature range may be about 220–320° C. For fluidized iron catalysts the temperatures used may run somewhat higher, say, up to about 350° C. Space velocities normally employed for cobalt-thoria and nickel-thoria are in the neighborhood of 100 volumes of synthesis gas (NTP) per volume of catalyst per hour. For fixed bed iron catalyst, space velocities may be as high as 150–300. When using fluidized iron catalysts considerably higher space velocities are used, generally of the order of 1000–3000 or even higher.

The following procedure describes the application of the present invention utilizing a finely divided reduced iron oxide catalyst in a fluidized operation taken by way of example:

(1) The catalyst is charged to the reactor at atmospheric temperature.

(2) Synthesis gas ($CO+H_2$ in a volume ratio of 1:1.5 to 1:2) is charged to the system at atmospheric temperature until the desired operating pressure (usually equivalent to 150 to 300 p. s. i. at 320° C.) is obtained.

(3) The reactor temperature is increased until the reaction begins (usually at about 260° C.), all the effluent gas being recycled. After the reaction begins, the carbon monoxide content of the effluent gas decreases from about 30 to about 2 to 3 volume per cent.

(4) After the reaction has begun, the reactor temperature is slowly increased to about 320° C., the desired subsequent operating temperature. At the same time, sufficient synthesis gas is continuously charged to the reactor to maintain the pressure substantially constant, and part of the effluent gas is withdrawn at a gradually increasing rate until the carbon monoxide content of the effluent gas increases from about 2–3 to about 6–12 volume per cent. The catalyst is now sufficiently broken in for use in producing liquid hydrocarbons. It is noteworthy that the carbon monoxide content of the effluent gas is a convenient control index for regulation of the rates of temperature increase and effluent gas withdrawal.

*Example*

In this example, reference is made to the accompanying drawing, which is a schematic flow diagram of a Fischer-Tropsch conversion system in connection with which the present invention may be practiced.

Fresh catalyst 5 is charged to reactor 4, which is provided with heating means and with cooling means, not shown. This catalyst is prepared by reducing finely ground, fused iron oxide with hydrogen as previously described. It contains 1 per cent potassium oxide and 3 per cent alumina as promoters and has a particle size of about 60- to 100-mesh. Synthesis gas (67 mol per cent hydrogen and 33 mol per cent carbon monoxide) enters reactor 4 at room temperature through inlet 2, which is provided with valve 3. Effluent gas passes through line 6, provided with cooler 7, to settler 8. It is, at first, completely recycled through conduit 11 to reactor 4, valves 13 and 10 being closed. The space velocity through reactor 4 is preferably 2500 to 5000 volumes of gas (STP) per volume of catalyst per hour. Screen 4a in reactor 4 separates any suspended catalyst from the effluent gas. Sufficient synthesis gas is charged to bring the pressure to a value equivalent to about 200 p. s. i. at 320° C. The temperature of reactor 4 is then raised to about 260° C., at which reaction begins. Reaction may be detected by the facts that a volume decrease occurs upon passage of the gas through the reactor, that the carbon monoxide content of the recycled gas decreases, and that the temperature of the catalyst bed increases. Sufficient synthesis gas is continuously added through inlet 2 to maintain the pressure substantially constant at 200 p. s. i. The carbon monoxide content of the recycle gas decreases to about 2 to 3 mol per cent.

The temperature of reactor 4 is now increased and part of the recycle gas is withdrawn, by suitable manipulation of valve 13 in outlet 12, at such rates that, over a period of 2 to 10 hours, the carbon monoxide content of the recycle gas in conduit 11 increases from about 2 to 3 to about 6 to 12 mol per cent.

The catalyst activity is now such that desirable yields of liquid hydrocarbons are obtained, and normal operation may proceed without further interruption.

During the breaking-in period, the main liquid product collected in settler 8 is water. As the breaking-in proceeds, more and more liquid hydrocarbons are formed. The liquid products are withdrawn, as desired, through outlet 9 by manipulation of valve 10.

I claim:

1. In a process for the conversion of carbon monoxide-hydrogen mixtures to form normally liquid hydrocarbons, the improvement which comprises modifying the high initial activity of fresh catalysts for the reaction which tend to produce high yields of normally gaseous products during the initial stages of the reaction in the following manner; (a) charging a synthesis gas containing essentially hydrogen and carbon monoxide in a volume ratio within the range of 1.5:1 to 2:1 to a reactor containing fresh synthesis catalyst at atmospheric temperature and at a desired operating pressure for the reaction; (b) gradually increasing the reactor temperature until the synthesis reaction begins, (c) recycling all of the reactor effluent gas to the reactor while introducing only sufficient fresh synthesis gas to maintain the pressure constant until the carbon monoxide content of said effluent gas is decreased to 2–3 volume per cent; (d) thereafter gradually increasing the reactor temperature to the desired synthesis temperature while charging only sufficient synthesis gas to the reactor to maintain the pressure constant and simultaneously withdrawing sufficient effluent gas at a gradually increasing rate until the carbon monoxide content of the effluent gas increases from 2–3 to 6–12 volume per cent.

2. In a process for the synthesis of hydrocarbons from carbon monoxide-hydrogen mixtures in which said mixtures are contacted with a hydrocarbon synthesis catalyst having a high initial activity, the method of modifying such initial activity which comprises contacting said catalyst with a synthesis gas comprising carbon monoxide and hydrogen at a pressure for effecting the synthesis reaction and at a temperature below that at which the synthesis reaction begins, gradually increasing the temperature to a temperature below the desired synthesis reaction temperature and at which the synthesis reaction begins, recycling the total amount of effluent gas into contact with said catalyst while introducing only sufficient synthesis gas to maintain the reaction pressure constant until the carbon monoxide concentration of said effluent gas decreases to 2-3 volume per cent, thereafter gradually increasing the temperature to the desired synthesis temperature while at the same time charging only sufficient synthesis gas to maintain the pressure constant and withdrawing effluent gas from the process at a gradually increasing rate such that the carbon monoxide content of the effluent gas increases from 2-3 volume per cent to 6-12 volume per cent.

3. A process according to claim 2 wherein the catalyst is iron.

4. A process according to claim 3 wherein the iron catalyst is in finely divided form, and wherein the reaction is carried out with the catalyst suspended in the synthesis gas.

5. A process according to claim 1 wherein the catalyst is a fluidized finely divided iron catalyst.

6. A process according to claim 1 wherein the increase in temperature in step ($d$) is carried out over a period of about 2-10 hours.

JOHN PAUL HOGAN.

REFERENCES CITED

The following references are of record in the file of this patent:

UNITED STATES PATENTS

| Number | Name | Date |
| --- | --- | --- |
| 2,257,457 | Fischer et al. | Sept. 30, 1941 |
| 2,345,957 | Wirth et al. | Apr. 4, 1944 |
| 2,360,787 | Murphree et al. | Oct. 17, 1944 |
| 2,445,795 | Millendorf | July 27, 1948 |